US010602368B2

(12) United States Patent
Mueck et al.

(10) Patent No.: US 10,602,368 B2
(45) Date of Patent: Mar. 24, 2020

(54) METHOD AND DEVICE FOR CONTROLLING ACCESS TO A LIMITED ACCESS SPECTRUM

(71) Applicant: Intel IP Corporation, Santa Clara, CA (US)

(72) Inventors: Markus Dominik Mueck, Unterhaching (DE); Biljana Badic, Munich (DE)

(73) Assignee: Intel IP Corporation, Santa Clara, CA (US)

( * ) Notice: Subject to any disclaimer, the term of this patent is extended or adjusted under 35 U.S.C. 154(b) by 20 days.

(21) Appl. No.: 15/393,332

(22) Filed: Dec. 29, 2016

(65) Prior Publication Data

US 2018/0192295 A1 Jul. 5, 2018

(51) Int. Cl.

*H04W 16/14* (2009.01)
*H04W 48/06* (2009.01)
*H04W 74/04* (2009.01)
*H04W 8/18* (2009.01)
*H04W 24/08* (2009.01)
*H04L 29/08* (2006.01)

(52) U.S. Cl.

CPC .......... *H04W 16/14* (2013.01); *H04W 48/06* (2013.01); *H04W 74/04* (2013.01); *H04L 67/306* (2013.01); *H04W 8/18* (2013.01); *H04W 24/08* (2013.01)

(58) Field of Classification Search

CPC ... H04W 16/02; H04W 16/14; H04W 72/042; H04W 24/08; H04W 8/00; H04W 12/02; H04W 24/10

See application file for complete search history.

(56) References Cited

U.S. PATENT DOCUMENTS

2004/0264423 A1 12/2004 Ginzburg et al.
2005/0094558 A1 5/2005 Lu
2013/0273958 A1* 10/2013 Srikanteswara ...... H04W 76/10 455/514

(Continued)

FOREIGN PATENT DOCUMENTS

WO 2016182634 A1 11/2016

OTHER PUBLICATIONS

International Search Report based on application No. PCT/US2017/087765 (11 pages) dated Apr. 13, 2018 (Reference Purpose Only).

*Primary Examiner* — Muthuswamy G Manoharan
(74) *Attorney, Agent, or Firm* — Viering, Jentschura & Partner MBB

(57) ABSTRACT

A method and device for controlling access to a limited access spectrum, the method including: authorizing a mobile communications device in a predefined geographic area to communicate via the limited access spectrum, wherein access by the mobile communications device to the limited access spectrum is based on a user profile defining access rights to the limited access spectrum; determining a load level of communications on the limited access spectrum in the predefined geographic area; and allocating a communications timing parameter to the mobile communications device based on the load level. In addition, the communications timing parameter may be further based on a priority status of a recipient of the communication from the mobile communications device.

18 Claims, 8 Drawing Sheets

(56) References Cited

U.S. PATENT DOCUMENTS

| | | | | |
|---|---|---|---|---|
| 2014/0185580 | A1* | 7/2014 | Fang | H04W 16/14 370/330 |
| 2015/0245374 | A1* | 8/2015 | Mitola, III | G06Q 30/08 370/329 |
| 2015/0257174 | A1 | 9/2015 | Liu | |
| 2015/0334719 | A1* | 11/2015 | Wang | H04L 1/00 370/329 |
| 2015/0358968 | A1* | 12/2015 | Malladi | H04W 16/14 455/454 |
| 2016/0043953 | A1* | 2/2016 | Ringland | H04W 28/0231 370/230 |
| 2016/0212624 | A1 | 7/2016 | Mueck et al. | |
| 2016/0249223 | A1* | 8/2016 | Egner | H04W 16/14 |
| 2018/0199375 | A1* | 7/2018 | Nezou | H04W 74/006 |

* cited by examiner

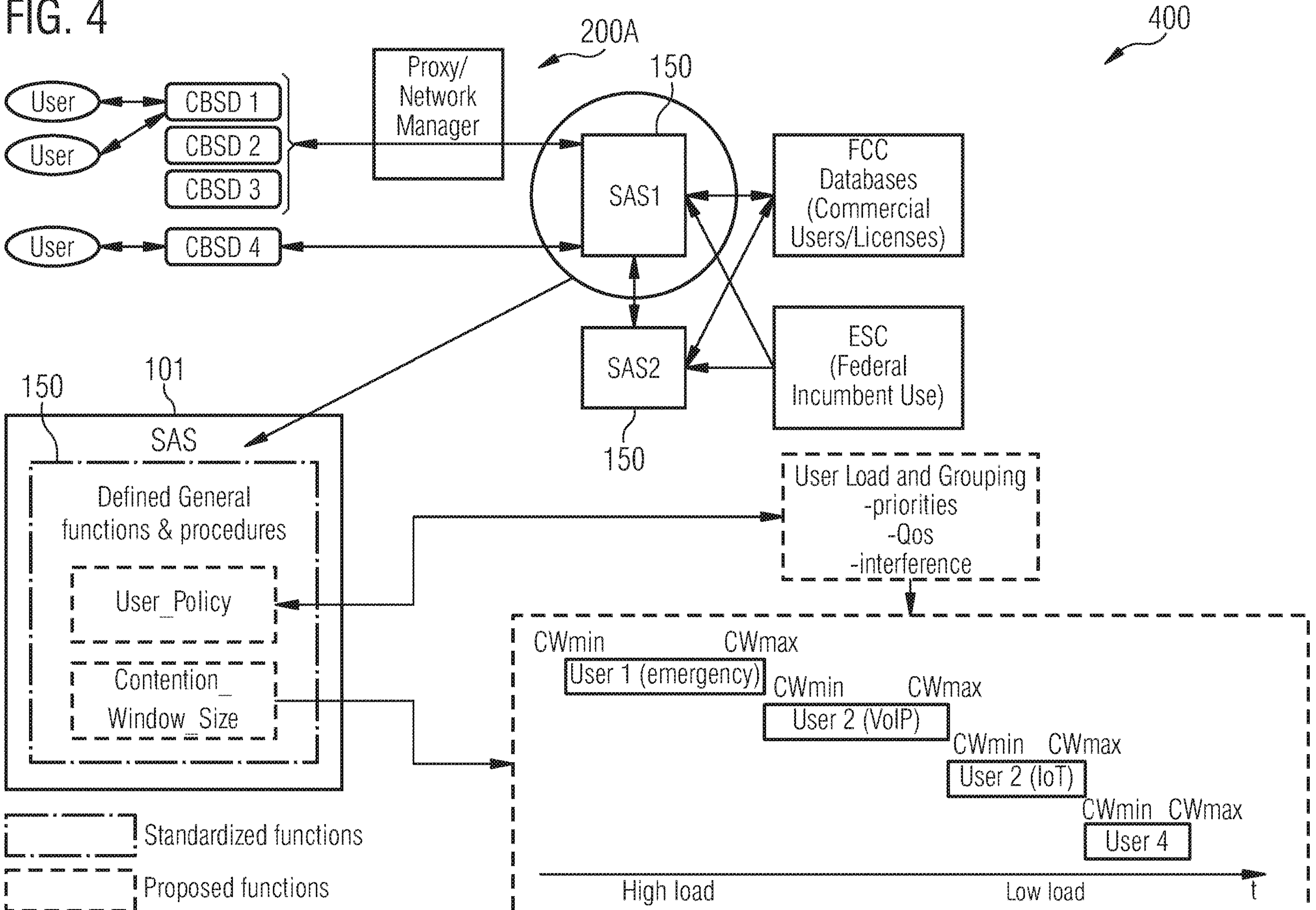
FIG. 4
200A
400
150
User
User
User
CBSD 1
CBSD 2
CBSD 3
CBSD 4
Proxy/
Network
Manager
SAS1
SAS2
150
FCC
Databases
(Commercial
Users/Licenses)
ESC
(Federal
Incumbent Use)
150
101
SAS
Defined General
functions & procedures
User_Policy
Contention_
Window_Size
User Load and Grouping
-priorities
-Qos
-interference
CWmin
CWmax
User 1 (emergency)
CWmin
CWmax
User 2 (VoIP)
CWmin
CWmax
User 2 (IoT)
CWmin
CWmax
User 4
High load
Low load
t
Standardized functions
Proposed functions

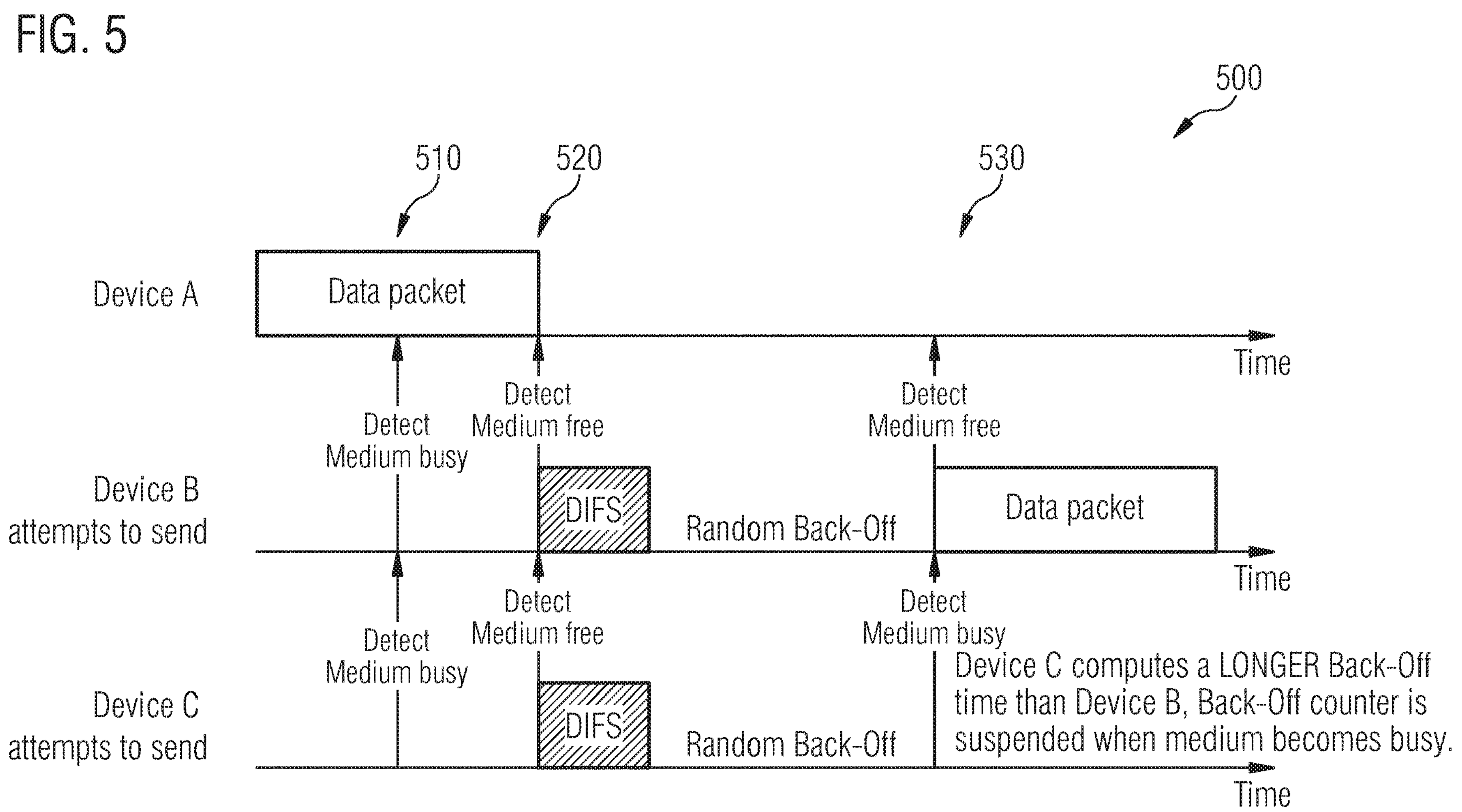
FIG. 5
500
510
520
530
Device A
Data packet
Time
Detect Medium busy
Detect Medium free
Detect Medium free
Device B attempts to send
DIFS
Random Back-Off
Data packet
Time
Detect Medium busy
Detect Medium free
Detect Medium busy
Device C computes a LONGER Back-Off time than Device B, Back-Off counter is suspended when medium becomes busy.
Device C attempts to send
DIFS
Random Back-Off
Time 600B
150
105-1
105-N
SAS Component
CBSD 1
CBSD N
Requests Network Load
611
612
Provision of Network Load Information
612
Provision of Network Load Information
Determines optimum Contention Window Parameter Set
613
Requests change of Contention Window Parameter Set
614

METHOD AND DEVICE FOR CONTROLLING ACCESS TO A LIMITED ACCESS SPECTRUM

TECHNICAL FIELD

Various embodiments relate generally to a method and device for controlling access to a limited access spectrum.

BACKGROUND

Mobile communications networks may have access to limited access spectrums according to proposals from government and industry entities. Examples of these proposals are the Spectrum Sharing System (SAS) in the United States and the Licensed Shared Access (LSA) system in Europe. The limited access spectrums may have certain registration protocols that require interfacing with system entities that control access to the limited access spectrum to protect the primary incumbent users of the spectrum.

These system entities, or controllers, may be utilized to enhance operational efficiency of radio access technologies (RATs), in particular RATs with collision avoidance protocols that are operating on the limited access spectrum for subordinate users below the primary incumbent user.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 4 shows a controller according to aspects of the disclosure.

FIG. 5 shows multiple mobile communications devices operating in accordance with a communications timing parameter.

DESCRIPTION

Figure 1A:
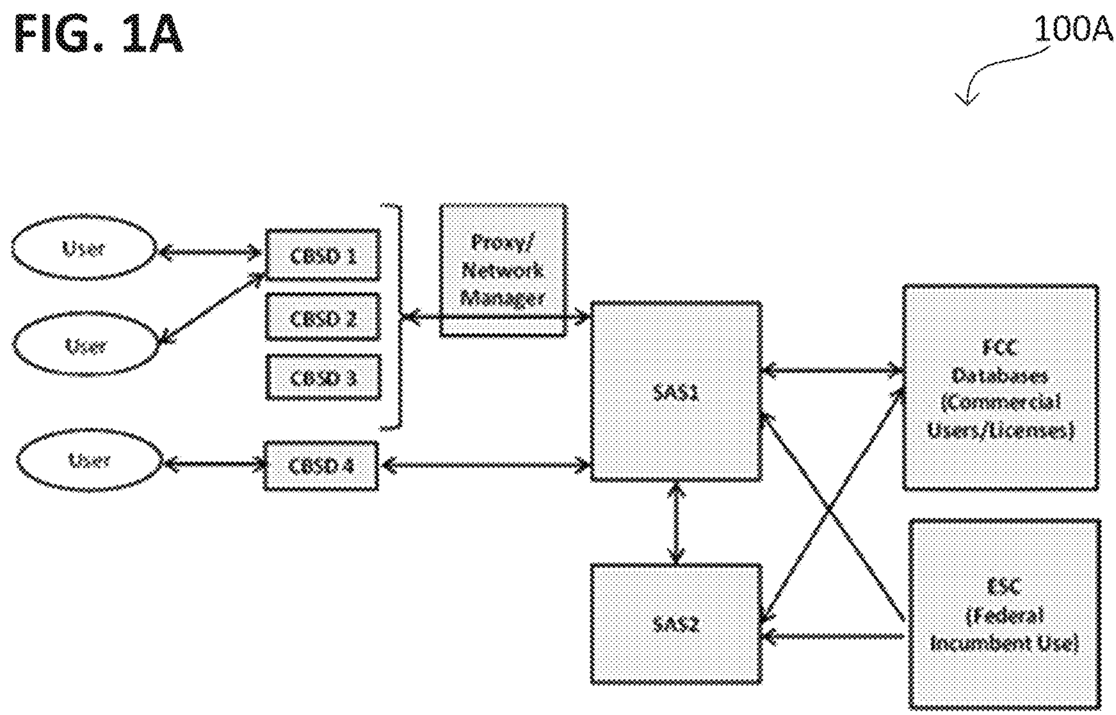
FIG. 1A shows a Spectrum Access System.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

As used herein, a "circuit" may be understood as any kind of logic (analog or digital) implementing entity, which may be special purpose circuitry or a processor executing software stored in a memory, firmware, hardware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as, for example, Java. Any other kind of implementation of the respective functions which will be described in more detail below may also be understood as a "circuit". It is understood that any two (or more) of the described circuits may be combined into a single circuit with substantially equivalent functionality, and, conversely, that any single described circuit may be distributed into two (or more) separate circuits with substantially equivalent functionality. In particular with respect to the use of "circuitry" in the Claims included herein, the use of "circuit" may be understood as collectively referring to two or more circuits.

A "processing circuit" (or equivalently, "processing circuitry") as used herein, is understood as referring to any circuit that performs an operation(s) on signal(s), such as, e.g., any circuit that performs processing on an electrical signal or an optical signal. A processing circuit may thus refer to any analog or digital circuitry that alters a characteristic or property of an electrical or optical signal, which may include analog data, digital data, or a combination thereof. A processing circuit may thus refer to an analog circuit (explicitly referred to as "analog processing circuit (ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g., a processor or microprocessor). As utilized herein, "digital processing circuit(ry)" may refer to a circuit implemented using digital logic that performs processing on a signal, e.g., an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single processing circuit may be equivalently split into two separate processing circuits, and conversely that two separate processing circuits may be combined into a single equivalent processing circuit.

As used herein, "memory" may be understood as a non-transitory computer readable medium, in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term "memory". It is appreciated that a single component referred to as "memory" or "a memory" may be composed of more than one different type of memory, and thus may refer to a collective component comprising one or more types of memory. It is readily understood that any single memory component may be separate multiple collectively equivalent memory components, and vice versa. Furthermore, it is appreciated that while memory may be depicted, such as in the drawings, as separate from one or more other components, it is understood that memory may be integrated within another component, such as on a common integrated chip.

The term "base station" used in reference to an access point of a mobile communications network may be understood as a macro base station, micro base station, Node B, evolved NodeB (eNB), Home eNodeB, Remote Radio Head (RRH), relay point, etc. As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

The following description may detail exemplary scenarios involving mobile communications devices operating according to certain 3GPP (Third Generation Partnership Project) specifications, notably Long Term Evolution (LTE) and Long Term Evolution-Advanced (LTE-A). It is understood that such exemplary scenarios are demonstrative in nature, and accordingly may be similarly applied to other mobile communication technologies and standards, such as any Cellular Wide Area radio communication technology, which may include, e.g., a 5th Generation (5G) communication systems, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g., UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 12), 3GPP Rel. 14 (3rd Generation Partnership Project Release 12), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code Division Multiple Access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, car radio phone), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, etc.), LTE standards used to share spectrum with other RATs in general (such as LTE in unlicensed spectrum (LTE-U), LTE License Assisted Access (LTE-LAA), MulteFire, as well as WiFi satndards (such as IEEE 802.11a, IEEE 802.11b, IEEE 802.11g, IEEE 802.11n, etc. The examples provided herein are thus understood as being applicable to various other mobile communication technologies, both existing and not yet formulated, particularly in cases where such mobile communication radio communications systems share the underlying features disclosed in the following examples.

The term "network" as utilized herein, e.g., in reference to a communication network such as a mobile communications network, encompasses both an access section of a network (e.g., a radio access network (RAN) section) and a core section of a network (e.g., a core network section). The term "radio idle mode" or "radio idle state" used herein in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the term "transmit" encompasses both direct (point-to-point) and indirect transmission (via one or more intermediary points). Similarly, the term "receive" encompasses both direct and indirect reception. The term "communicate" or "communications" encompasses one or both of transmitting and receiving, i.e., unidirectional or bidirectional communication in one or both of the incoming and outgoing directions. The term "calculate" encompass both "direct" calculations via a mathematical expression/formula/relationship and "indirect" calculations via lookup tables and other array indexing or searching operations.

In spectrum sharing schemes such as Licensed Spectrum Access (LSA, proposed mainly for Europe in the 2.3-2.4 GHz bands) and Spectrum Access System (SAS, proposed mainly in the U.S. for the 3.55-3.7 GHz bands), Mobile Network Operators (MNOs) may be granted access to previously restricted radio frequency bands. These frequency bands may, for example, have previously been reserved solely for other users, known as incumbents, such as a military user. Accordingly, an SAS or LSA licensee may license certain targeted frequency bands from incumbents, and thus may be able to utilize the shared frequency bands. Utilization of the frequency band may be restricted to time periods or locations where the frequency band is not in use by the incumbent. Licensees, which may also be referred to as Priority Access License (PAL) user, may be characterized as lower-tiered users, while incumbents may be characterized as higher-tiered users. Additionally, an additional tier, such as General Authorized Access (GAA) users may be characterized as lower-tiered users relative to PAL users. GAA users may be restricted to time periods or locations where the frequency band is not in use by the incumbent or a PAL user.

While the targeted frequency bands for LSA and SAS may already be officially licensed and/or owned by the incumbents (mainly related to government use), the targeted frequency bands may be under-utilized over time and/or space. For example, the incumbents may utilize the targeted frequency bands relatively rarely, and/or may employ the targeted frequency bands only in certain areas. Accordingly, LSA and SAS propose a system in which the targeted frequency bands may be made available to cellular MNOs and other users in scenarios (both geographically and temporally dependent) where the incumbent is not occupying the band. For example, one or more licensed MNOs may be granted access to the targeted frequency bands in scenarios where the incumbent is not actively occupying the targeted frequency bands, and accordingly may utilize the newly available bandwidth for mobile communications.

With regard to SAS, proposed SAS arrangements may allow tiered users to operate on the 3.55-3.7 GHz frequency band on a shared basis with an incumbent. SAS proposes a three-tier hierarchy including: a first tier (tier-1) composed of incumbents, a second tier (tier-2) composed of PAL users, and third tier (tier-3) composed of GAA users. In this three-tier system, tier-2 users, or "Priority Access License" (PAL) users, may only be allocated a limited portion of the entire SAS band (e.g., the PAL spectrum may be assigned up to 70 MHz bandwidth) in the absence of an incumbent. The remaining spectrum, in addition to any unused portions of the PAL spectrum, which may be at least 80 MHz of spectrum, may be allotted to GAA users that may typically employ the available tier-3 spectrum for LTE Licensed Assisted Access (LTE-LAA), LTE in unlicensed spectrum (LTE-U), MulteFire, or WiFi-type systems.

FIG. 1A shows block diagram 100A illustrating an SAS network architecture. SAS may be designed to ensure coexistence between incumbent users that are not able to provide any a-priori information to a centralized database. As indicated above, SAS may employ a three-tiered system composed of incumbents (tier-1), PAL users (tier-2), and GAA users (tier-3). SAS incumbent users may thus be the highest tier and may generally be protected from interference from the lower-tier PAL and GAA users. Such SAS incumbent users may conventionally be governmental or military related, such as Department of Defense (DoD) radars, and may also include other wireless systems such as Fixed Satellite Service (FSS) stations and certain grandfathered terrestrial wireless systems. PAL users (which may include MNOs) may license 10 MHz bands in certain geographic areas (census tracts) and may receive interference protection from GAA users while accepting certain levels of interference from incumbent users. As incumbents are expected to be protected from interference from all lower-tier users, PAL users may be required to vacate the licensed band in certain scenarios where incumbent users wish to utilize the licensed band (where the specifics and frequency of such scenarios may depend on the particulars of each license). As the lowest-tier (tier-3), GAA users may not receive any interference protection (thus accepting interference from both PAL and incumbent users), and may similarly face vacation scenarios in order to protect incumbent users.

As shown in FIG. 1A, SAS systems may additionally include an Environmental Sensing Capability (ESC) entity, which may be employed in order to protect incumbent users from interference from PAL and GAA users. Such ESC entities may be composed of a sensor network to detect radio activity by incumbent users, such as, e.g., detecting radio activity by military radar, which may allow an SAS entity to instruct PAL and GAA users to cease transmissions on the shared spectrum and/or re-allocate transmission to a different portion of the shared spectrum in order to protect active incumbents.

Accordingly, SAS networks may include one or more SAS entities (e.g., SAS 1 and SAS 2 as shown in FIG. 1A), which may interact with licensee users (GAA and PAL) in order to facilitate spectrum sharing, while also guaranteeing interference protection to higher-tiered users from lower-tiered users. Each SAS entity (e.g., an SAS controller) thus interacts with the network architectures of the licensee users. As shown in FIG. 1A, an SAS entity may interact with mobile communications devices that communicate with mobile communication devices of users. Each network transmitter, e.g., a base station or small cell, are referred to as Citizens Broadband Radio Service Devices (CBSD) in the context of SAS, and may thus be able to transmit wireless signals to end users (shown in FIG. 1A) according to the shared spectrum access permitted by the corresponding SAS entity. For example, SAS 1 may interact with a single licensee transmitter (e.g., CBSD 4) or with a network of licensee transmitters (e.g., CBSD 1-CBSD 3) via a proxy/network manager entity, which may act as an interface between a SAS entity and the various network components of a given MNO's network. FCC databases may maintain details of CBSDs for PAL and GAA users, such as location and status. SAS entities may aim to ensure that both the CBSDs (e.g., base stations and small cells) and end users (e.g., user equipment or mobile terminals) do not cause excessive interference to incumbent users, which the SAS framework may enforce by specifying certain maximum permitted transmit power levels for CBSDs and end user terminals.

In comparison to SAS, LSA has identified the 2.3-2.4 GHz frequency band (corresponding to 3GPP LTE Band 40) as a suitable candidate for spectrum sharing, and has additionally been the focus of proposals to also incorporate the 700 MHz and/or 3.6-3.8 GHz bands. Under the proposed LSA framework, a licensee (e.g., an MNO or any other entity that operates a wireless network) may operate a 3GPP LTE network on a shared license basis, where a licensee may engage in a multi-year sharing contract with an incumbent (such as, e.g., 10 years or more). As incumbents maintain prioritized access of the targeted LSA band over all licensees, any licensee may be required to vacate the targeted LSA band for a given geographic area, given frequency range, and given period of time during which an incumbent is accessing the targeted LSA band.

Figure 1B:
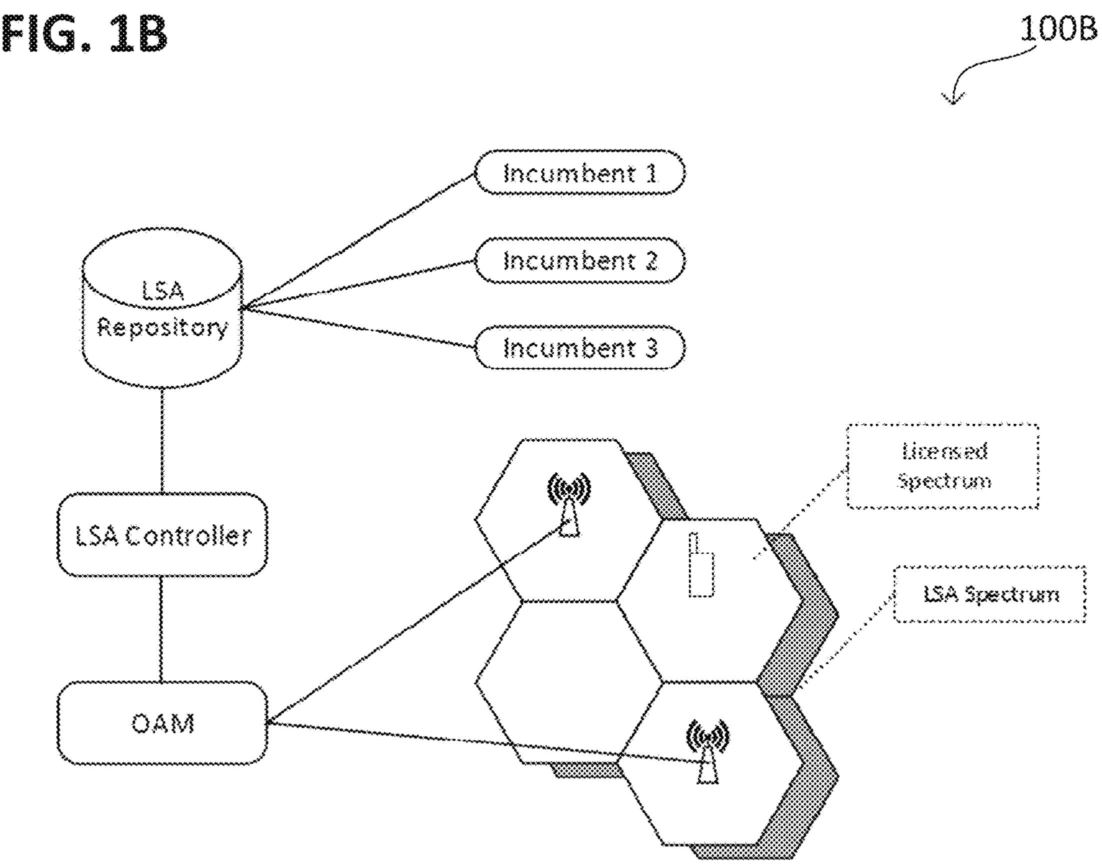
FIG. 1B shows a Licensed Sharing Access system.

FIG. 1B shows block diagram 100B illustrating an LSA network architecture. As shown in FIG. 1B, LSA spectrum management may rely on a centralized LSA Repository. Incumbents may be required to provide a-priori usage information to the database on the availability of LSA spectrum on a time- and geographic-basis. Depending on the indicated usage information, an LSA controller may employ control mechanisms to grant/deny spectrum access to various licensed incumbents and issue commands to vacate concerned bands. In the current proposed operational approach for LSA, sensing mechanisms may not be required to support the system for identification of incumbent operation. Accordingly, in many cases, users may not need to perform sensing to detect incumbent usage; however, this may potentially be adapted in future proposals.

The LSA repository may be a centralized entity that falls outside of the domain of the MNOs and may interface with the various incumbent users. In the context of LSA, such incumbent users may include wireless cameras (which are allocated spectrum in the targeted LSA band in Europe). Each LSA controller (wherein each MNO network may include one or more LSA controllers) may thus interface with the LSA repository in order to access the a-priori information provided by the various incumbent users. As shown in FIG. 1B, an LSA controller may interface with the Operations, Administration, and Management (OAM) framework of the MNO in order to provide information on the availability of the shared spectrum to the relevant MNO network components including base stations and end user terminals.

With regard to the SAS and LSA systems above, components of the systems themselves may be utilized to support user operations that implement collision avoidance protocols, e.g., carrier sense multiple access with collision avoidance (CSMA/CA), which would increase improve system performance. Lower tier users in a SAS system, in particular third tier or GAA users, may implement collision avoidance protocols in such systems as WiFi, LTE-U, LAA, and MulteFire. Although third tier users are not currently implemented in LSA, such users may be contemplated in accordance with the same or similar underlying principles of an SAS deployment. Accordingly, a system controller, such as a SAS controller, may be utilized to provide the additional support.

The SAS controller is well-positioned to oversee network communications as all mobile communication devices requesting access to the SAS spectrum are required to interface with a central node, such as an SAS controller. As such, a SAS controller may be able to observe the level of medium occupancy (e.g., the amount of communications traffic on the SAS spectrum) and may be in a position to prioritize communications for certain users (which may improve quality of service (QoS) and/or quality of experience (QoE)). The positioning of a SAS controller may thus be exploited to improve performance.

However, utilizing the SAS controller for support should not introduce severe overhead requirements that would degrade performance. Therefore, a SAS controller should not perform detailed resource management that may dramatically increase communication overhead. Rather, a SAS controller may direct various mobile communication devices, such as CBSDs, through short, sporadic messages that may consume only a small portion of the computational and messaging resources of a SAS controller.

Figure 2A:
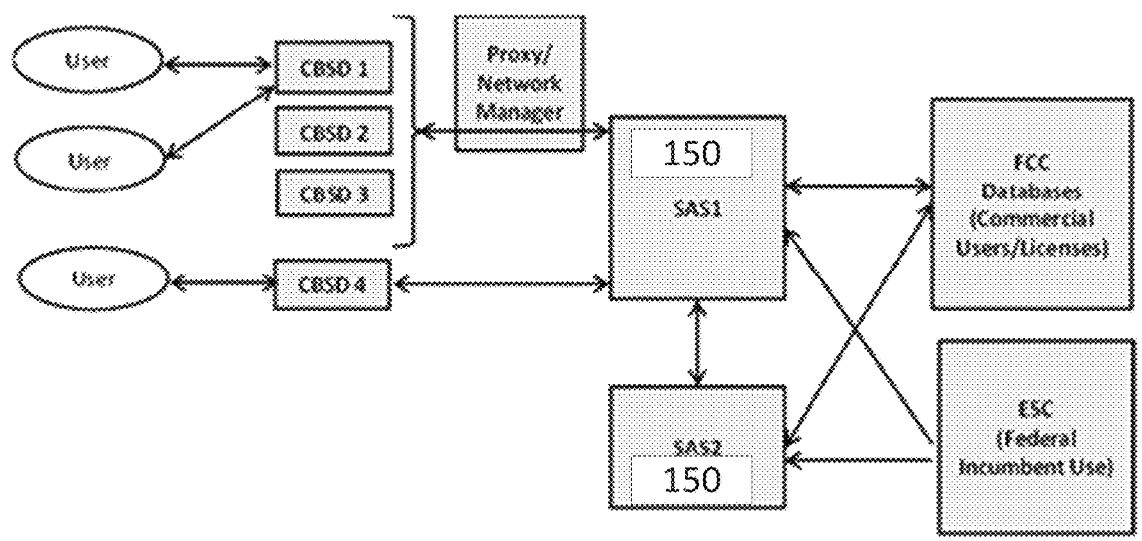
FIG. 2A shows a Spectrum Access System with a controller according to aspects of the disclosure.

In accordance with FIG. 2A, block diagram 200A may illustrate a SAS network as described above in conjunction with FIG. 1A. The SAS entities here, however, may include an additional controller 150 (e.g., additional circuitry, non-transitory computer readable medium, and/or a means to implement a method, etc., in SAS 1 and SAS 2). Controller 150 may improve performance of the SAS network in accordance with this description, at least for GAA users communicating over radio access technologies utilizing collision avoidance protocols.

Figure 2B:
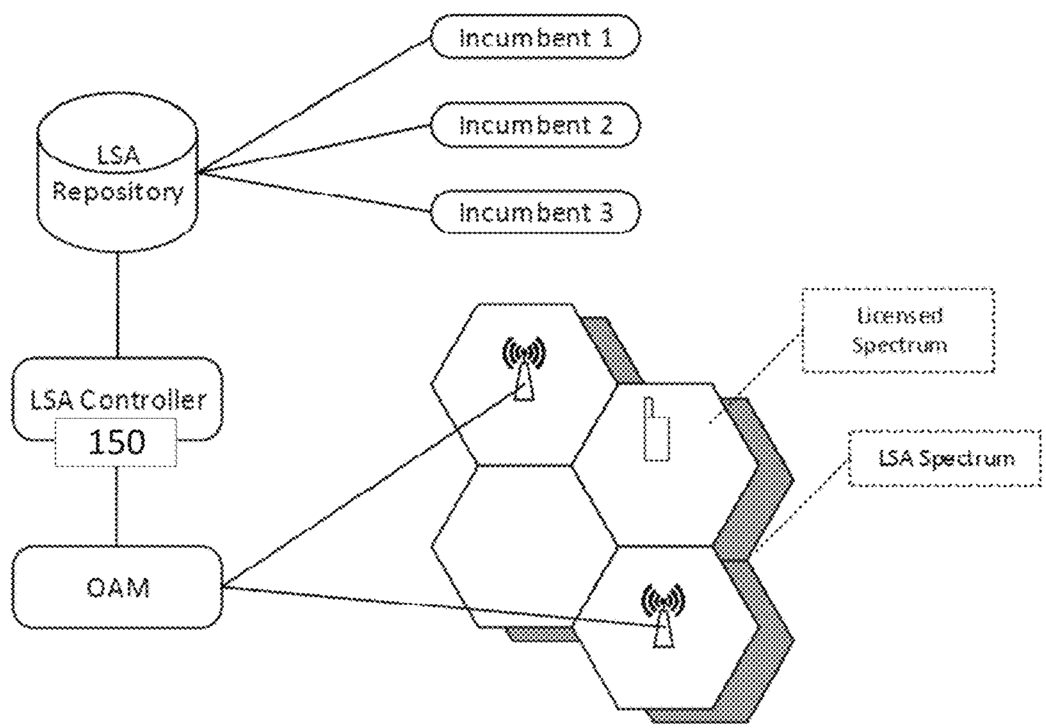
FIG. 2B shows a Licensed Sharing Access system with a controller according to aspects of the disclosure.

Likewise, in accordance with FIG. 2B, block diagram 200B may illustrate an LSA network in accordance with FIG. 1B above. The LSA controller 111 here, however, may include an additional controller 150 (e.g., additional circuitry, non-transitory computer readable medium, and/or a means to implement a method, etc.). Controller 150 may improve performance of the LSA network in accordance with this description, at least for lower-tiered users communicating over radio access technologies utilizing collision avoidance protocols.

Figure 3:
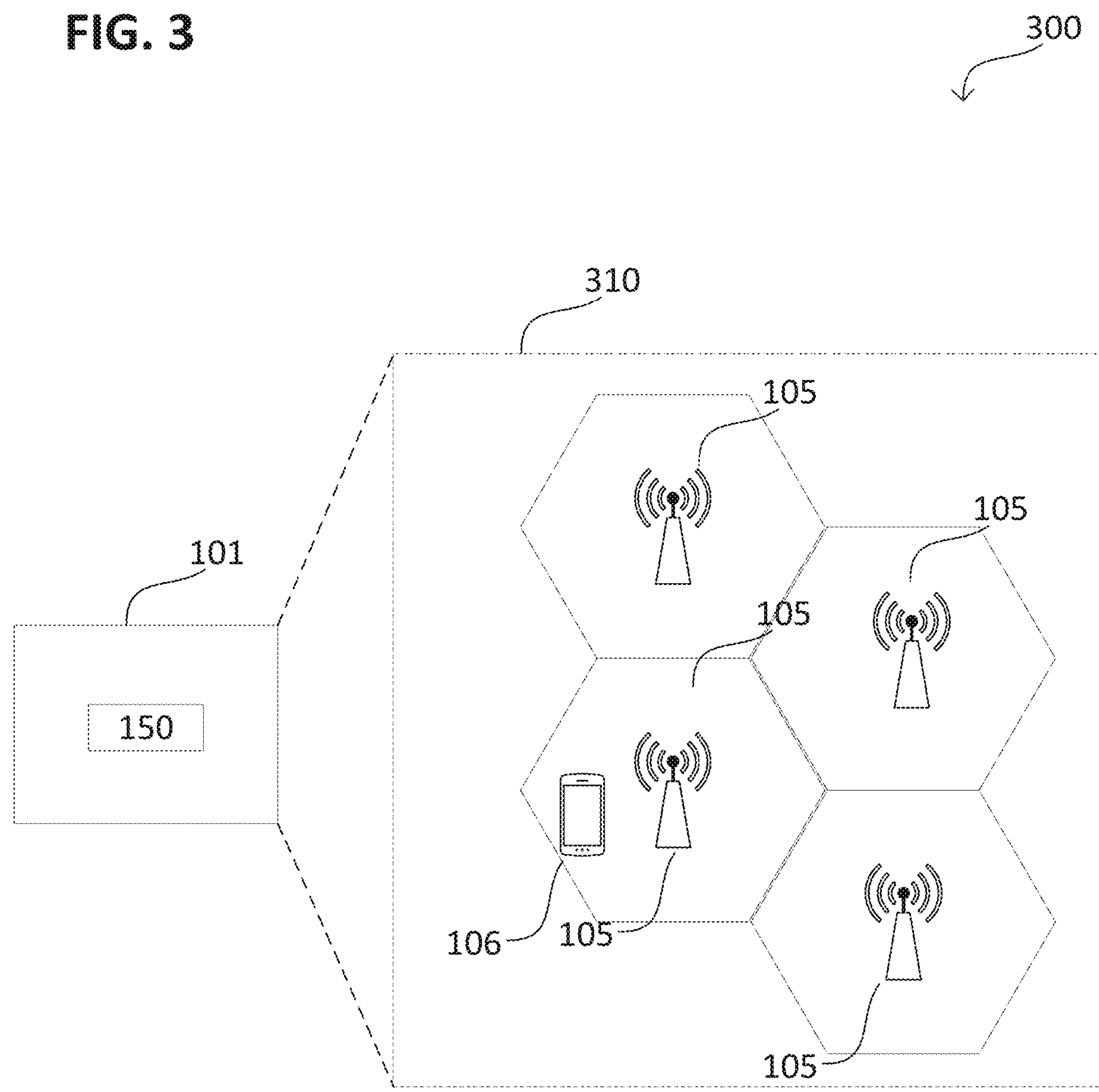
FIG. 3 shows a predefined geographical area of a limited access spectrum network.

Controller 150 will be described in more detail in the following description. FIG. 3 shows a block diagram 300 illustrating a network for controlling access to a limited access spectrum. As discussed above, common to a SAS system and an LSA system is a central node, or controller 101, which may include an additional controller 150 (e.g., implemented as additional circuitry, non-transitory computer readable medium, and/or a means to implement a method, etc.). Controller 101 may be a single central node or may include a plurality of controllers.

Controller 101 may regulate access to a limited access spectrum, such as a SAS or LSA network described above. The limited access spectrum may be accessible in a plurality of predefined geographic areas, such as predefined geographic area 310 in FIG. 3. The predefined geographic area 310 may be based on a spatial geographic area containing a certain population level, for example a census tract as defined by the U.S. Bureau of the Census.

Within the predefined geographic area 310 may be located a plurality of mobile communication devices. A mobile communications device 105 may be a CBSD, which may include a base station or an access point. The mobile communications device may also be a user equipment (UE) 106. The mobile communications devices may be connected to controller 101 in order to communicate over the limited access spectrum.

As an example, a CBSD may request access to the limited access spectrum to communicate with UE 106. The controller 101 may ensure effective coexistence between the tiers of users of the limited access spectrum (e.g., frequency band). The controller 101 may obtain information about registered or licensed commercial users in the limited access spectrum from a government entity database, e.g., from an FCC database, and information about primary users (superior-tiered users), or incumbent users of the limited access spectrum from sensors, e.g., from an ESC, and interacts directly or indirectly through a proxy (such as a network manager) with mobile communication devices, e.g., CBSDs, operating in the limited access spectrum to ensure the CBSDs operate in a manner consistent with their respective authorizations and promote efficient use of the spectrum resource. Controllers 101 may synchronize with one another to ensure coordination between CBSDs that use different controllers 101.

In accordance with the above, a controller 101 may authorize a mobile communications device in a predefined geographic area 310 to communicate via the limited access spectrum, wherein access by the mobile communications device to the limited access spectrum is based on a user profile that defines access rights to the limited access spectrum, e.g., a tiered-user system as in SAS or LSA systems; determine a load level of communications on the limited access spectrum within the predefined geographic area; and allocate a communications timing parameter to the mobile communications device based on the load level. The communications timing parameter may be further based on a priority status of a recipient of the communication from the mobile communications device.

Therefore, controller 101 may increase overall communication efficiency over the limited access spectrum by adjustment of the communications timing parameter, e.g., such as a contention window size of a collision avoidance protocol, based on the load level. By suitable selection and allocation of the communications timing parameter depending on the load of the system and user requirements, performance may be improved in higher load contexts and may enable prioritization of particular users. Thus, performance of collision avoidance protocols may be improved.

For example, in comparison to CSMA/CA protocols implemented in Institute of Electrical and Electronics Engineers (IEEE) standards, such as 802.11e, certain features are directed to introducing priority classes for transmission opportunities (TxOP), which is a feature of Enhanced Distributed Channel Access (EDCA), and to introducing a mixture of contention-based periods (a listen-before-talk period) and contention-free periods (a period where devices are given explicit permissions to communicate), which is a feature of HCF (hybrid coordination function) Controlled Channel Access (HCCA). These features, however, may be insufficient for coordination across multiple distinct technologies, such as MultiFire and WiFi, as the above features may only be available within a network of devices operating under the 802.11e standard, and a limited access spectrum may be accessed by multiple technologies. In addition, the above features may not resolve issues in varying load cases, e.g., in particular, high load cases.

Furthermore, in another example, time division multiple access (TDMA) based WiFi systems may address poor resource efficiency in high load scenarios, but cannot coordinate across multiple distinct technologies, and introduce significant communication overhead via the provision of resource allocation messages by a central control node. Accordingly, controller 101 is in an advantageous position to improve performance of communication efficiency, as will be further discussed with regard to FIG. 4 below.

FIG. 4 shows block diagram 400, illustrating controller 101. As shown in FIG. 4, controller 101, e.g., a SAS controller, may be part of a SAS network in accordance with block diagram 200A. Controller 150 may be part of controller 101 and may improve performance of a limited access spectrum network by allocating a communications timing parameter based on a load level, and may further improve performance by prioritizing certain communications by further basing the allocation of the communications timing parameter on a priority status of a recipient of the communication.

The communications timing parameter may define a time period used by the mobile communications device to attempt a transmission. The communications timing parameter may be a contention window, e.g., according to a CSMA/CA protocol, that defines the time period. The contention window may have a minimum time value (CWmin) and a maximum time value (CWmax) defining the time period. The time period may be defined in terms of a binary scale, e.g., CWmax may be calculated according to $2^{n-1}$, where n is a whole number. The time period, the minimum time value, and the maximum time value may all be independently variable, i.e., if the load level is determined to be above an upper predefined threshold, the contention window may have the greatest time period, the greatest minimum time value, and the greatest maximum time value, in comparison to time periods, minimum values, and maximum values, for contention windows corresponding to load levels within other predefined thresholds; whereas for a load level below a lower predefined threshold, the contention window may have the least time period, the least minimum time value, and the least maximum time value, in comparison to time periods, minimum values, and maximum values, for contention windows corresponding to load levels within other predefined thresholds.

For example, if the load level is determined to be above an upper predefined threshold, the contention window may have a first time period, a first minimum time value, and a first maximum time value, and for a load level below a lower predefined threshold, the contention window may have a second time period, a second minimum time value, and a second maximum time value; wherein the first time period is greater than the second time period, the first minimum time value is greater than the second minimum time value, and the first maximum time value is greater than the second maximum time value.

Accordingly, by adjusting the contention window used by the mobile communication devices, the communication performance efficiency may be improved based on load levels. For example, a short back-off window range (contention window size parameter) may be preferable at a low load, but may lead to a high level of collisions for high load scenarios. Therefore, the controller 101 may shorten the communications timing parameter for low load and increase it for higher loads, i.e., in low load scenarios, the minimum time value may be reduced (e.g., allowing for shorter contention windows) and also the range between the minimum time value and the maximum time value (the time period) may be reduced. In high load scenarios, the inverse may be implemented.

In FIG. 4, the diagram illustrates controller 150 may consider the contention window size (based on a load level of the mobile communications device in the predefined geographic area) and a user policy (e.g., a priority status) to determine the communications timing parameter. Controller 150 may consider the contention window size and a user policy may be considered in combination or as a sole parameter upon which to determine the communications timing parameter. As illustrated along the time axis, the blocks may represent a time period, and as may be seen, at high load, a time period (i.e., of the communications timing parameter) may have the longest relative time period (e.g., a first value), while at a low load, the time period may have the shortest relative time period (e.g., a second value).

As is also illustrated in FIG. 4, the communications timing parameter may optionally be further based on a priority status of a recipient of the communication from the mobile communications device. The priority status may be tiered, with a preferred tier having higher priority than subsequent tiers. The preferred tier may be allocated a lesser time period than the subsequent tiers. Therefore, the priority status may further optimize communications timing parameters. The priority status may be based on user identity, i.e., the recipient, for example emergency services, on QoS requirements, e.g., voice over internet protocol (VoIP) services may have a higher priority, or services requiring low interference levels. As shown in the diagram, an exemplary tiered system may have emergency services with the highest priority status, VoIP services having the next priority status, internet of things (IoT) users having the next priority status, and all other users having the lowest priority status.

Exemplary communications timing parameters may be implemented as follows, but may be set according to any suitable parameters for the particular context, e.g., a SAS system. The load level (discussed in greater detail below) may be divided into a plurality of load levels defined by threshold values. For example, the load levels may include an “average load”, a “low load”, and a “high load”, which may be differentiated via respective predefined threshold values. Thus, an upper predefined threshold value may define the difference between the “average load” and the “high load”, and a lower predefined threshold value may define the difference between the “average load” and the “low load”. The following exemplary communications timing parameters may be for WiFi, but similar values may be adapted by the CBSD for individual technologies, such as, LTE-U, LAA, and MulteFire.

An “average load” for the various WiFi standards may be as follows:

| | | |
|---|---|---|
| 802.11b | aCWmin 31 | aCWmax 1023 |
| 802.11g | aCWmin 31 | aCWmax 1023 (when 802.11b stations present) |
| 802.11g | aCWmin 31 | aCWmax 1023 |
| 802.11a | aCWmin 31 | aCWmax 1023 |
| 802.11n | aCWmin 31 | aCWmax 1023. |

A “low load” may have reduced CWmin and CWmax values for the various WiFi standards, and may be as follows:

| | | |
|---|---|---|
| 802.11b | aCWmin 15 | aCWmax 255 |
| 802.11g | aCWmin 15 | aCWmax 255 (when 802.11b stations present) |
| 802.11g | aCWmin 7 | aCWmax 255 |
| 802.11a | aCWmin 7 | aCWmax 255 |
| 802.11n | aCWmin 7 | aCWmax 255. |

A “high load” may have increased CWmin and CWmax values for the various WiFi standards, and may be as follows:

| | | |
|---|---|---|
| 802.11b | aCWmin 63 | aCWmax 2047 |
| 802.11g | aCWmin 63 | aCWmax 2047 (when 802.11b stations present) |
| 802.11g | aCWmin 31 | aCWmax 2047 |
| 802.11a | aCWmin 31 | aCWmax 2047 |
| 802.11n | aCWmin 31 | aCWmax 2047. |

Furthermore, as discussed above, a priority status (e.g., user policy) may also be used to determine the communications timing parameter. As an example, a provider of a Citizen Broadband Radio Service (CBRS) or any other suitable stakeholder may allocate different priority statuses to different users, which may be defined, e.g., as “gold” (a preferred tier) users having preferred priority, while “silver” users have a lower priority (e.g., below standard users). For example, a “silver” user may rarely obtain access to the limited access spectrum if a large number of “gold” users are active. Thus depending on the priority status, the determination of the communications timing parameter may be optimized with low CWmin and CWmax values for preferred, higher priorities, and high CWmin and CWmax values for lower priorities. The high CWmin and CWmax values for lower priorities may create long back-off periods, while the low CWmin and CWmax values for higher priorities may create short back-off periods. Therefore, the higher priority users may be accessing the limited access spectrum before the back-off period for the lower priority users has ended.

As an example, the communications timing parameters may be adjusted as follows according to priority statuses:

Standard User: no modification, e.g., the load level based communications timing parameter, aCWmin and aCWmax remain unchanged.

“Gold” User: reduction of contention window;

aCWmin=(((aCWmin)+1)/2)−1;

aCWmax=(((aCWmax)+1)/2)−1.

“Silver” User: increase of contention window;

aCWmin=(((aCWmin)+1)*2)−1;

aCWmax=(((aCWmax)+1)*2)−1.

The performance benefits of allocating the communications timing parameter based on the load level, and optionally, further based on a priority status, may be illustrated in block diagram 500 of FIG. 5. Device A, Device B, and Device C, may be mobile communications devices, e.g., CBSDs, which may be connected to a SAS controller 101. Device A, Device B, and Device C, may all be located within the same predefined geographic area 310, and may be attempting to transmit over a limited access spectrum to various user equipment.

In general, once the limited access spectrum is detected to be free (according to listen-before-talk principles or carrier sensing), a mobile communications device may randomly select a value for its random back-off timer. The random back-off timer value must be within the communications timing parameter, e.g., within the contention window, as defined for the priority queue, which is initially defined as ranging from 0 to CWmin. If a collision occurs (when two mobile communication devices transmit at the same time), no acknowledgment of the frame will be received by the mobile communications device, which will then increment a retry counter and increase the contention window according to a binary exponential back-off algorithm (e.g., according to CSMA/CA protocols), up to the maximum time value (e.g., CWmax) of the communications timing parameter.

Therefore, the probability of a collision (and thus the need for a retransmission) is dependent on the load level and the accordingly allocated communications timing parameter. For example, at a low load, a small CWmin value may be sufficient, since the random back-off time is small and the limited access spectrum may be used efficiently. In addition, with a small number of mobile communications devices, the probability of multiple mobile communications devices starting to send data packets at the end of their respective random back-off phases is relatively low. The overall system efficiency may, therefore, be greatly increased.

At a high load, on the other hand, a small CWmin value may lead to a high collision probability, since some mobile communications devices will determine similar random back-off values (as the range between 0 and CWmin is small and the number are random variables following a constant distribution). It is thus advantageous to increase CWmin, as this reduces the resource usage efficiency, but also reduces the collision probability since random back-off values are typically sufficiently varied to avoid a simultaneous start of sending data packets.

As discussed above, the controller 101 may advantageously adapt the communications timing parameter based on the load level, thereby optimizing the probability of a collision for the particular load level.

Returning to FIG. 5, at time 510, Device A may be transmitting. Device B and Device C may detect the limited access spectrum is in use. At time 520, Device B and Device C may detect that Device A has finished transmitting. Device B and Device C may wait for the DIFS (distributed coordination function inter-frame spacing) period to expire as well as the random back-off period.

The random back-off period (according to a binary exponential back-off algorithm) may be calculated based on a number of collisions (determined by the failure to receive an acknowledgement after transmission). The number of collisions, c, may be used to calculate a value $2^c-1$ (which may not exceed the maximum time value of the communications timing parameter). A random number of slot times between 0 and $2^c-1$ are selected for the back-off time.

At time 530, the random back-off time for Device B has expired and Device B has detected the limited access spectrum is free, and thus begins to transmit. Device C may be considered to have a random back-off timer expiring at time 530+, as it detects the limited access spectrum is busy. The back-off counter may then be suspended until the limited access spectrum is detected to be free again.

In order to allocate the communications timing parameter, the controller 101 may first determine the load level of communications on the limited access spectrum in the predefined geographic area. The load level may be based on at least one of: an amount of access requests to the limited access spectrum, an amount of observed collisions, and/or an amount of transmission errors. The amount of access requests to the limited access spectrum may be determined with the least overhead by the controller 101. The amount of observed collisions and the amount of transmission errors may require more overhead by the controller 101, as discussed below.

Figure 6A:
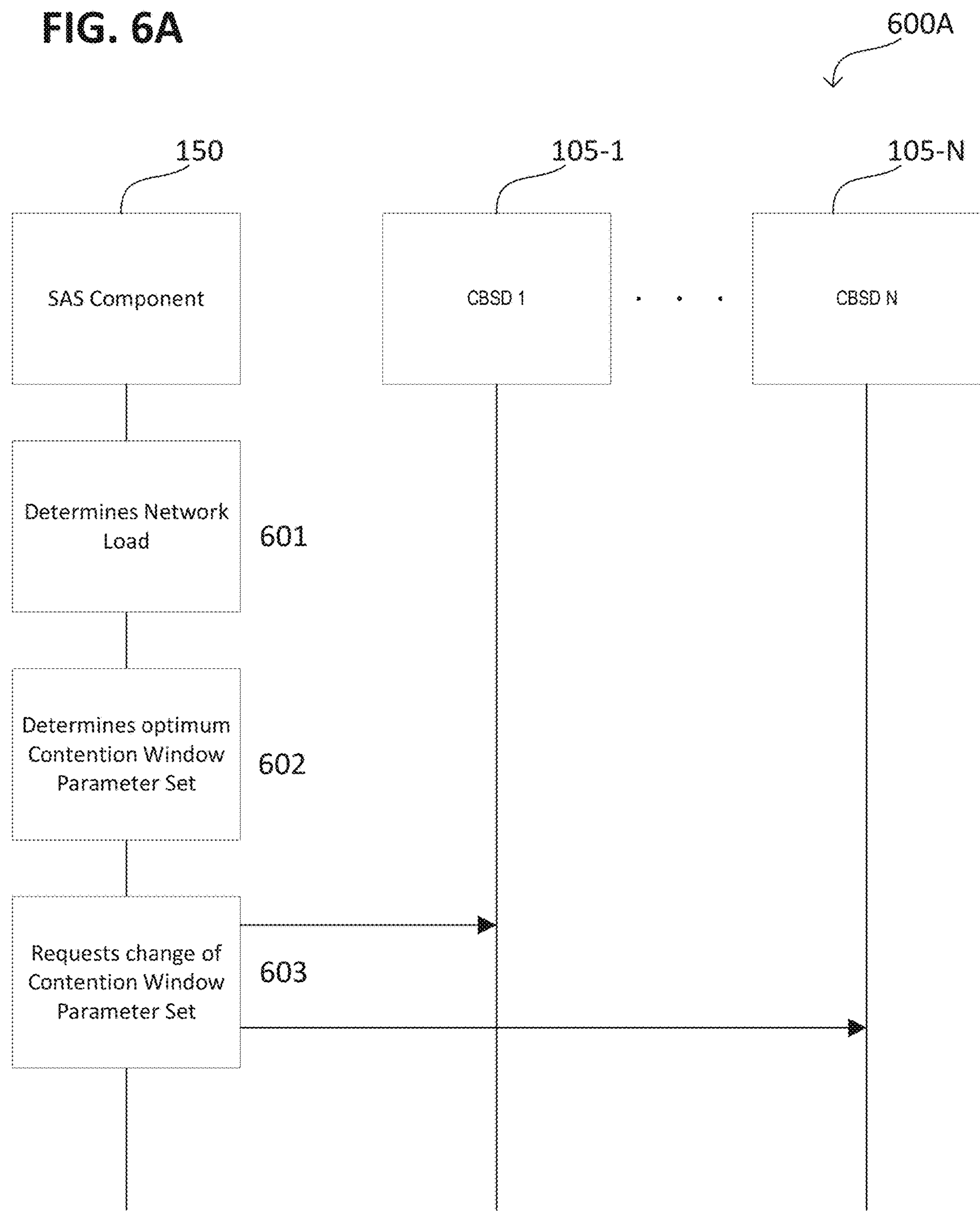
FIGS. 6A & 6B show message sequence charts depicting determination of a load level on a limited access spectrum network.

FIG. 6A shows diagram 600A of an exemplary determination of the load level of communications on the limited access spectrum in the predefined geographic area. A controller 101 may include controller 150 and mobile communications devices 105-1 through 105-N, e.g., CBSDs. As shown here, at 601, the controller 101 may be able to directly determine an amount of access requests to the limited access spectrum, e.g., a number of CBSDs authorized to operate on the limited access spectrum in the predefined geographic area 310 at a given time, as the mobile communication devices must request access from controller 101. Thus, the amount should be available to the controller 101, as it is also required by the FCC for the purpose of guaranteeing incumbent protection). At 602, the amount of access requests may be compared to predefined threshold values, e.g., the upper predefined threshold value and the lower predefined threshold value described above. These threshold values may be chosen to optimize the probability of collisions (i.e., avoid or reduce the occurrence of collisions). Based on the threshold values, e.g., above or below a threshold, the communications timing parameter may be determined. At 603, the communications timing parameter based on the load level is allocated to the mobile communication devices 105-1 through 105-N.

Figure 6B:
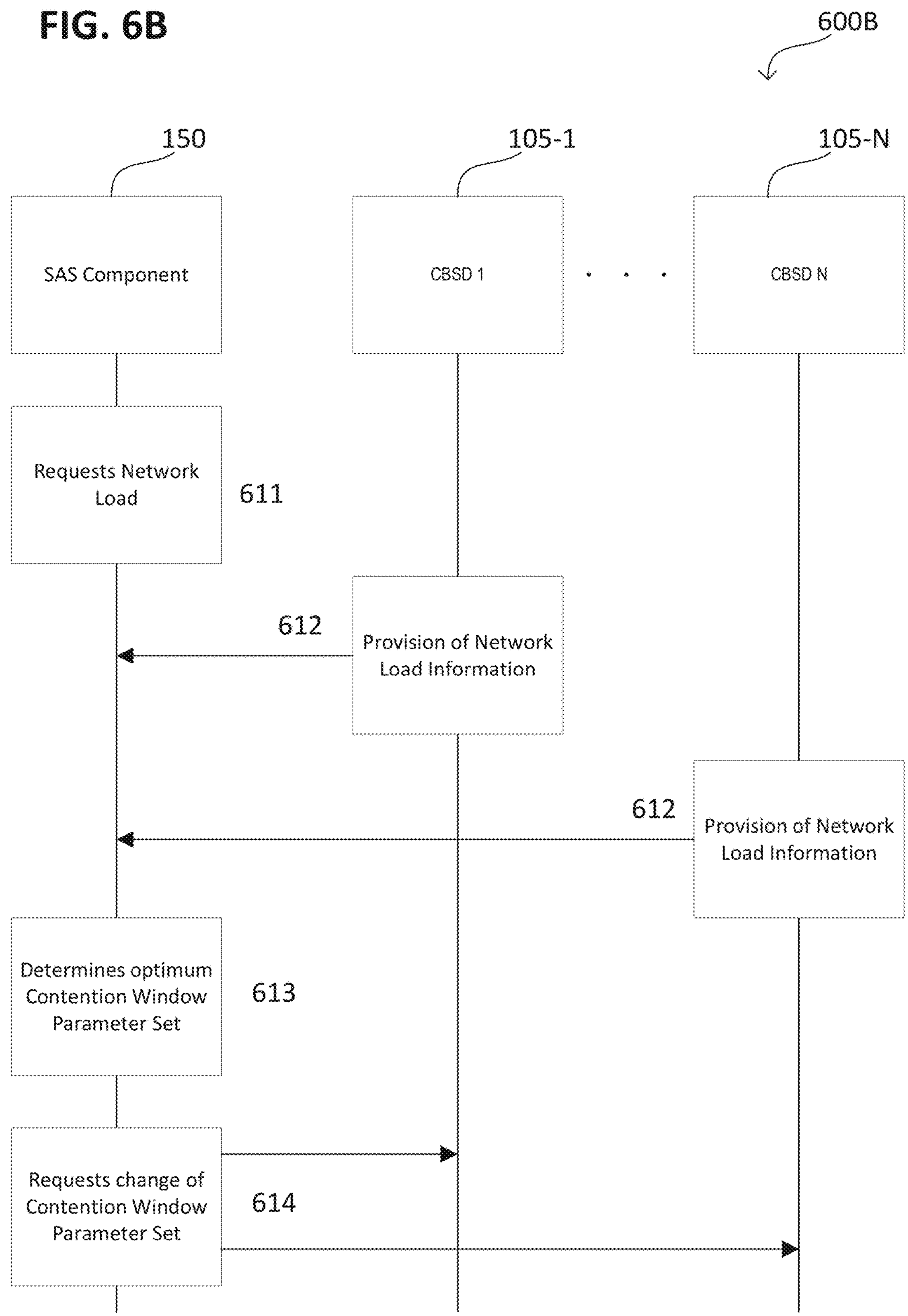

Additionally or alternatively, the load levels may be determined based on information received at controller 101 from the mobile communication devices, as shown in diagram 600B of FIG. 6B. Here, controller 101 may request the mobile communications devices 105-1 through 105-N report information on the load levels at 611. The information may be based on an amount of observed collisions and/or an amount of transmission errors. The amount of observed collisions may be based on transmission repeat requests, e.g., hybrid automatic repeat requests (HARQ), and the amount of transmission errors may be based on at least one of packet error rates (PER) and/or bit error rates (BER), observed by a mobile communications device. The information may be requested from one mobile communications device, all mobile communications devices, or a statistically significant number of mobile communication devices in the predefined geographic area.

At 612, the requested information is sent to controller 101. At 613, the communications timing parameter may be determined based on the information representative of the load level. At 614, the communications timing parameter may be sent to the mobile communications devices 105-1 through 105-N. Controller 101 may also determine the load level based on a combination of the available information of the amount of access requests to the limited access spectrum, and also requested information from the mobile communications devices.

Furthermore, controller 101 may update the load level of communications after a predefined period of time, which may be periodic. Accordingly, the communications timing parameter for the mobile communications devices in the predefined geographic area 310 may be adjusted if the load level has been determined to have changed after the update.

Figure 7:
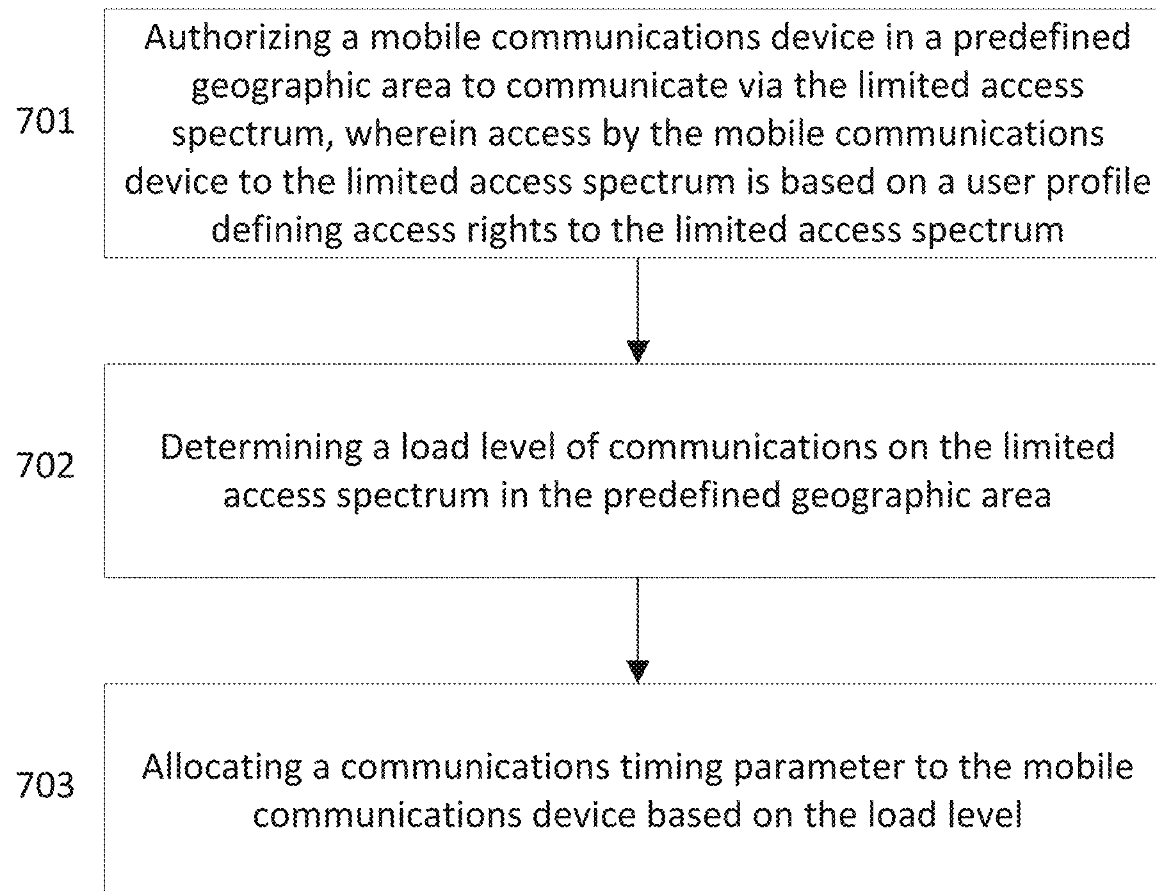
FIG. 7 shows a flow chart for controlling access to a limited access spectrum.

In accordance with the above description, FIG. 7 shows a method 700 of controlling access to a limited access spectrum. The method may be performed by non-transitory computer readable medium having computer executable instructions that cause a processing circuit to execute the method, as well as any means for performing the function of the method. The method may include, at 701, authorizing a mobile communications device in a predefined geographic area to communicate via the limited access spectrum, wherein access by the mobile communications device to the limited access spectrum is based on a user profile defining access rights to the limited access spectrum; at 702, determining a load level of communications on the limited access spectrum in the predefined geographic area; and, at 703, allocating a communications timing parameter to the mobile communications device based on the load level.

The limited access spectrum of method 700 may be a wireless communications spectrum in a Spectrum Access System (SAS), e.g., in the United States. The limited access spectrum may be from 3.55 GHz to 3.7 GHz. Alternatively, the limited access spectrum may be a Licensed Shared Access (LSA) system from 2.3 GHz to 2.4 GHz, e.g., in Europe.

The limited access spectrum may be primarily reserved for a governmental use and/or military use. The limited access spectrum may also be secondarily reserved for a licensee, e.g., a priority access license user (PAL) that has obtained rights to a portion of the limited access spectrum when the limited access spectrum is not in use by the primary user. The limited access spectrum may also allow access to tertiary or other subordinate users.

Thus, the user profile may be a subordinate user, e.g., a GAA user, allowed access to the limited access spectrum when superior user profiles are not presently accessing the limited access spectrum. The superior user profiles may include a primary user, e.g., government or military incumbents, having unlimited access to the limited access spectrum and a licensee, e.g., PAL user, allowed secondary access to the limited access spectrum if the primary user is not presently accessing the limited access spectrum.

Method 700 may be performed by a controller. The controller may be a SAS controller and the mobile communications device may be connected to the controller. The mobile communications device may be at least one of: a base station, an access point, and/or a user equipment. The mobile communications device may be a CBSD. Alternatively, the controller may be an LSA controller.

The predefined geographic area of method 700 may be based on a population level, such as a census tract defined by the U.S. Bureau of the Census.

In method 700, the communications timing parameter may define a time period used by the mobile communications device to attempt a transmission, e.g., the mobile communications device may wait for a randomly determined amount of time based on the communications timing parameter to expire before attempting the transmission. Thus, the time period has a first value when the load level determined at 702 is above an upper predefined threshold and the time period has a second value when the load level is below a lower predefined threshold, wherein the first value is greater than the second value. The communications timing parameter may be a contention window defining the time period. The contention window may have a minimum time value and a maximum time value defining the time period.

Furthermore, based on the load level determined at 702, the contention window for the load level above the upper predefined threshold may have the greatest time period, the greatest minimum time value, and the greatest maximum time value, in comparison to any other contention windows for load levels below the upper threshold level. The contention window for the load level below the lower predefined threshold may have the least time period, the least minimum time value, and the least maximum time value, in comparison to any other contention windows for load levels above the lower threshold level.

In addition, the communications timing parameter may be further based on a priority status of a recipient of the communication from the mobile communications device. The priority status may be tiered, with a preferred tier having higher priority than subsequent tiers. The preferred tier may be allocated a lesser time period than the subsequent tiers. Thus, based on the priority status, the communications timing parameter may be further adjusted.

The load level of communication on the limited access spectrum in the predefined geographic area may be based on at least one of: an amount of access requests to the limited access spectrum, an amount of observed collisions, and/or an amount of transmission error. The amount of observed collisions may be based on transmission repeat requests, e.g., a HARQ amount for a mobile communications device. The amount of transmission errors may be based on at least one of PER and/or BER. The amount of access requests may be determined by the controller, and the amount of observed collisions and the amount of transmission errors may be determined by the mobile communications device and reported to the controller.

Method 700 may further include updating the load level of communications on the limited access spectrum in the predefined geographic area after a predefined amount of time. The predefined amount of time may be periodic (or aperiodic). If the load level has changed after the update, the communications timing parameter may be adjusted for the mobile communications device.

In an embodiment of the disclosure, Example 1 may be a method of controlling access to a limited access spectrum via a controller, the method including: authorizing a mobile communications device in a predefined geographic area to communicate via the limited access spectrum, wherein access by the mobile communications device to the limited access spectrum is based on a user profile defining access rights to the limited access spectrum; determining a load level of communications on the limited access spectrum in the predefined geographic area; and allocating a communications timing parameter to the mobile communications device based on the load level.

Example 2 may include the method of Example 1, wherein the communications timing parameter defines a time period used by the mobile communications device to attempt a transmission.

Example 3 may include the method of Example 2, wherein the communications timing parameter is further based on a priority status of a recipient of the communication from the mobile communications device.

Example 4 may include the method of Example 3, wherein the priority status is tiered, with a preferred tier having higher priority than subsequent tiers.

Example 5 may include the method of Example 4, wherein the preferred tier is allocated a lesser time period than the subsequent tiers.

Example 6 may include the method of Example 2, wherein the time period has a first value when the load level is above an upper predefined threshold.

Example 7 may include the method of Example 6, wherein the time period has a second value when the load level is below a lower predefined threshold, wherein the first value is greater than the second value.

Example 8 may include the method of any one of Examples 2-7, further including: updating the load level of communications on the limited access spectrum in the predefined geographic area after a predefined amount of time.

Example 9 may include the method of Example 8, wherein the predefined amount of time is periodic.

Example 10 may include the method of any one of Examples 8 or 9, further including: adjusting the communications timing parameter for the mobile communications device if the load level is changed after updating.

Example 11 may include the method of any one of Examples 1-10, wherein the mobile communications device is a Citizen Broadband Service Device (CBSD).

Example 12 may include the method of Example 11, wherein the mobile communications device is at least one of: a base station, an access point, and/or a user equipment.

Example 13 may include the method of any one of Examples 1-23 wherein the mobile communications device is connected to the controller.

Example 14 may include the method of any one of Examples 1-13, wherein the limited access spectrum is in a Spectrum Access System (SAS).

Example 15 may include the method of any one of Examples 1-14, wherein the limited access spectrum is from 3.55 GHz-3.7 GHz.

Example 16 may include the method of any one of Examples 1-15 wherein the limited access spectrum is primarily reserved for a governmental use.

Example 17 may include the method of any one of Examples 1-15, wherein the limited access spectrum is primarily reserved for a military use.

Example 18 may include the method of any one of Examples 1-17, wherein the limited access spectrum is secondarily reserved for licensees.

Example 19 may include the method of any one of Examples 1-17, wherein the limited access spectrum is secondarily reserved for Priority Access License holders.

Example 20 may include the method of any one of Examples 1-13, wherein the limited access spectrum is in a Licensed Shared Access (LSA) system.

Example 21 may include the method of any one of Examples 1-13, wherein the limited access spectrum is from 2.3 GHz-2.4 GHz.

Example 22 may include the method of any one of Examples 1-19, wherein the controller is a Spectrum Access System (SAS) controller.

Example 23 may include the method of any one of Examples 1-13, 20, and 21, wherein the controller is a Licensed Shared Access (LSA) controller.

Example 24 may include the method of any one of Examples 1-19, wherein the predefined geographic area is based on a population level.

Example 25 may include the method of any one of Examples 1-19, wherein the predefined geographic area is a census tract.

Example 26 may include the method of Example 25, wherein the census tract is defined by a Bureau of the Census.

Example 27 may include the method of any one of Examples 1-26, wherein the user profile is a subordinate user allowed access to the limited access spectrum when superior user profiles are not presently accessing the limited access spectrum.

Example 28 may include the method of any Example 27, wherein the superior user profiles include a primary user having unlimited access to the limited access spectrum and a licensee allowed secondary access to the limited access spectrum if a primary user is not presently accessing the limited access spectrum.

Example 29 may include the method of any one of Examples 1-19, 22, and 24-28, wherein the user profile is a Priority Access License (PAL) holder.

Example 30 may include the method of any one of Examples 1-19, 22, and 24-28, wherein the user profile is a General Authorized Access (GAA) user.

Example 31 may include the method of any one of Examples 1-30, where the load level of communications on the limited access spectrum in the predefined geographic area is based on at least one of: an amount of access requests to the limited access spectrum, an amount of observed collisions, and/or an amount of transmission errors.

Example 32 may include the method of Example 31, wherein the amount of observed collisions is based on transmission repeat requests.

Example 33 may include the method of Example 31, wherein the transmission repeat requests are hybrid automatic repeat requests.

Example 34 may include the method of Example 31, wherein the amount of transmission errors is based on at least one of Packet Error Rates (PER) and/or Bit Error Rates (BER).

Example 35 may include the method of Example 31, wherein the amount of access requests to the limited access spectrum is determined by the controller.

Example 36 may include the method of Example 31, wherein the amount of observed collisions and the amount of transmission errors is determined by the mobile communications device.

Example 37 may include the method of any one of Examples 2-36, wherein the communications timing parameter is a contention window defining the time period.

Example 38 may include the method of Example 37, wherein the contention window has a minimum time value and a maximum time value defining the time period.

Example 39 may include the method of Example 38, wherein the contention window for the load level above the upper predefined threshold has a first time period, a first minimum time value, and a first maximum time value.

Example 40 may include the method of Example 39, wherein the contention window for the load level below the lower predefined threshold has a second time period, a second minimum time value, and a second maximum time value, wherein the first time period is greater than the second time period, the first minimum time value is greater than the second minimum time value, and the first maximum time value is greater than the second maximum time value.

In an embodiment of the disclosure, Example 41 may be a non-transitory computer readable medium having computer executable instructions that cause a processing circuit to perform a method, the method controlling access to a limited access spectrum via a controller, the method including: authorizing a mobile communications device in a predefined geographic area to communicate via the limited access spectrum, wherein access by the mobile communications device to the limited access spectrum is based on a user profile defining access rights to the limited access spectrum; determining a load level of communications on the limited access spectrum in the predefined geographic area; and allocating a communications timing parameter to the mobile communications device based on the load level.

Example 42 may include the method of Example 41, wherein the communications timing parameter defines a time period used by the mobile communications device to attempt a transmission.

Example 43 may include the method of Example 42, wherein the communications timing parameter is further based on a priority status of a recipient of the communication from the mobile communications device.

Example 44 may include the method of Example 43, wherein the priority status is tiered, with a preferred tier having higher priority than subsequent tiers.

Example 45 may include the method of Example 44, wherein the preferred tier is allocated a lesser time period than the subsequent tiers.

Example 46 may include the method of Example 42, wherein the time period has a first value when the load level is above an upper predefined threshold.

Example 47 may include the method of Example 46, wherein the time period has a second value when the load level is below a lower predefined threshold, wherein the first value is greater than the second value.

Example 48 may include the method of any one of Examples 42-47, further including: updating the load level of communications on the limited access spectrum in the predefined geographic area after a predefined amount of time.

Example 49 may include the method of Example 48, wherein the predefined amount of time is periodic.

Example 50 may include the method of any one of Examples 48 or 49, further including: adjusting the communications timing parameter for the mobile communications device if the load level is changed after updating.

Example 51 may include the method of any one of Examples 41-50, wherein the mobile communications device is a Citizen Broadband Service Device (CBSD).

Example 52 may include the method of Example 51, wherein the mobile communications device is at least one of: a base station, an access point, and/or a user equipment.

Example 53 may include the method of any one of Examples 41-63, wherein the mobile communications device is connected to the controller.

Example 54 may include the method of any one of Examples 41-43, wherein the limited access spectrum is in a Spectrum Access System (SAS).

Example 55 may include the method of any one of Examples 41-54, wherein the limited access spectrum is from 3.55 GHz-3.7 GHz.

Example 56 may include the method of any one of Examples 41-55, wherein the limited access spectrum is primarily reserved for a governmental use.

Example 57 may include the method of any one of Examples 41-55, wherein the limited access spectrum is primarily reserved for a military use.

Example 58 may include the method of any one of Examples 41-57, wherein the limited access spectrum is secondarily reserved for licensees.

Example 59 may include the method of any one of Examples 41-57, wherein the limited access spectrum is secondarily reserved for Priority Access License holders.

Example 60 may include the method of any one of Examples 41-53, wherein the limited access spectrum is in a Licensed Shared Access (LSA) system.

Example 61 may include the method of any one of Examples 41-53, wherein the limited access spectrum is from 2.3 GHz-2.4 GHz.

Example 62 may include the method of any one of Examples 41-59, wherein the controller is a Spectrum Access System (SAS) controller.

Example 63 may include the method of any one of Examples 41-53, 60, and 61, wherein the controller is a Licensed Shared Access (LSA) controller.

Example 64 may include the method of any one of Examples 41-59, wherein the predefined geographic area is based on a population level.

Example 65 may include the method of any one of Examples 41-59, wherein the predefined geographic area is a census tract.

Example 66 may include the method of Example 65, wherein the census tract is defined by a Bureau of the Census.

Example 67 may include the method of any one of Examples 41-66, wherein the user profile is a subordinate user allowed access to the limited access spectrum when superior user profiles are not presently accessing the limited access spectrum.

Example 68 may include the method of any Example 67, wherein the superior user profiles include a primary user having unlimited access to the limited access spectrum and a licensee allowed secondary access to the limited access spectrum if a primary user is not presently accessing the limited access spectrum.

Example 69 may include the method of any one of Examples 41-59, 62, and 64-68, wherein the user profile is a Priority Access License (PAL) holder.

Example 70 may include the method of any one of Examples 41-59, 62, and 64-68, wherein the user profile is a General Authorized Access (GAA) user.

Example 71 may include the method of any one of Examples 41-70, where the load level of communications on the limited access spectrum in the predefined geographic area is based on at least one of: an amount of access requests to the limited access spectrum, an amount of observed collisions, and/or an amount of transmission errors.

Example 72 may include the method of Example 71, wherein the amount of observed collisions is based on transmission repeat requests.

Example 73 may include the method of Example 71, wherein the transmission repeat requests are hybrid automatic repeat requests.

Example 74 may include the method of Example 71, wherein the amount of transmission errors is based on at least one of Packet Error Rates (PER) and/or Bit Error Rates (BER).

Example 75 may include the method of Example 71, wherein the amount of access requests to the limited access spectrum is determined by the controller.

Example 76 may include the method of Example 71, wherein the amount of observed collisions and the amount of transmission errors is determined by the mobile communications device.

Example 77 may include the method of any one of Examples 42-76, wherein the communications timing parameter is a contention window defining the time period.

Example 78 may include the method of Example 77, wherein the contention window has a minimum time value and a maximum time value defining the time period.

Example 79 may include the method of Example 78, wherein the contention window for the load level above the upper predefined threshold has a first time period, a first minimum time value, and a first maximum time value.

Example 80 may include the method of Example 79, wherein the contention window for the load level below the lower predefined threshold has a second time period, a second minimum time value, and a second maximum time value, wherein the first time period is greater than the second time period, the first minimum time value is greater than the second minimum time value, and the first maximum time value is greater than the second maximum time value.

In an aspect of the disclosure, Example 81 may be a controller configured to control access to a limited access spectrum, wherein the control is configured to: authorize a mobile communications device in a predefined geographic area to communicate via the limited access spectrum, wherein access by the mobile communications device to the limited access spectrum is based on a user profile defining access rights to the limited access spectrum; determine a load level of communications on the limited access spectrum in the predefined geographic area; and allocate a communications timing parameter to the mobile communications device based on the load level.

Example 82 may include the controller of Example 81, wherein the communications timing parameter defines a time period used by the mobile communications device to attempt a transmission.

Example 83 may include the controller of Example 82, wherein the communications timing parameter is further based on a priority status of a recipient of the communication from the mobile communications device.

Example 84 may include the controller of Example 83, wherein the priority status is tiered, with a preferred tier having higher priority than subsequent tiers.

Example 85 may include the controller of Example 84, wherein the preferred tier is allocated a lesser time period than the subsequent tiers.

Example 86 may include the controller of Example 82, wherein the time period has a first value when the load level is above an upper predefined threshold.

Example 87 may include the controller of any one of Examples 82 or 86, wherein the time period has a second value when the load level is below a lower predefined threshold, wherein the first value is greater than the second value.

Example 88 may include the controller of any one of Examples 82-87, further including: updating the load level of communications on the limited access spectrum in the predefined geographic area after a predefined amount of time.

Example 89 may include the controller of Example 88, wherein the predefined amount of time is periodic.

Example 90 may include the controller of any one of Examples 88 or 89, further including: adjusting the communications timing parameter for the mobile communications device if the load level is changed after updating.

Example 91 may include the controller of any one of Examples 81-90, wherein the mobile communications device is a Citizen Broadband Service Device (CBSD).

Example 92 may include the controller of Example 91, wherein the mobile communications device is at least one of: a base station, an access point, and/or a user equipment.

Example 93 may include the controller of any one of Examples 81-103, wherein the mobile communications device is connected to the controller.

Example 94 may include the controller of any one of Examples 81-83, wherein the limited access spectrum is in a Spectrum Access System (SAS).

Example 95 may include the controller of any one of Examples 81-94, wherein the limited access spectrum is from 3.55 GHz-3.7 GHz.

Example 96 may include the controller of any one of Examples 81-95, wherein the limited access spectrum is primarily reserved for a governmental use.

Example 97 may include the controller of any one of Examples 81-95, wherein the limited access spectrum is primarily reserved for a military use.

Example 98 may include the controller of any one of Examples 81-97, wherein the limited access spectrum is secondarily reserved for licensees.

Example 99 may include the controller of any one of Examples 81-97, wherein the limited access spectrum is secondarily reserved for Priority Access License holders.

Example 100 may include the controller of any one of Examples 81-93, wherein the limited access spectrum is in a Licensed Shared Access (LSA) system.

Example 101 may include the controller of any one of Examples 81-93, wherein the limited access spectrum is from 2.3 GHz-2.4 GHz.

Example 102 may include the controller of any one of Examples 81-99, wherein the controller is a Spectrum Access System (SAS) controller.

Example 103 may include the controller of any one of Examples 81-93, 100, and 101, wherein the controller is a Licensed Shared Access (LSA) controller.

Example 104 may include the controller of any one of Examples 81-99, wherein the predefined geographic area is based on a population level.

Example 105 may include the controller of any one of Examples 81-99, wherein the predefined geographic area is a census tract.

Example 106 may include the controller of Example 105, wherein the census tract is defined by a Bureau of the Census.

Example 107 may include the controller of any one of Examples 81-106, wherein the user profile is a subordinate user allowed access to the limited access spectrum when superior user profiles are not presently accessing the limited access spectrum.

Example 108 may include the controller of any Example 107, wherein the superior user profiles include a primary user having unlimited access to the limited access spectrum and a licensee allowed secondary access to the limited access spectrum if a primary user is not presently accessing the limited access spectrum.

Example 109 may include the controller of any one of Examples 81-99, 102, and 104-108, wherein the user profile is a Priority Access License (PAL) holder.

Example 110 may include the controller of any one of Examples 81-99, 102, and 104-108, wherein the user profile is a General Authorized Access (GAA) user.

Example 111 may include the controller of any one of Examples 81-110, where the load level of communications on the limited access spectrum in the predefined geographic area is based on at least one of: an amount of access requests to the limited access spectrum, an amount of observed collisions, and/or an amount of transmission errors.

Example 112 may include the controller of Example 111, wherein the amount of observed collisions is based on transmission repeat requests.

Example 113 may include the controller of Example 111, wherein the transmission repeat requests are hybrid automatic repeat requests.

Example 114 may include the controller of Example 111, wherein the amount of transmission errors is based on at least one of Packet Error Rates (PER) and/or Bit Error Rates (BER).

Example 115 may include the controller of Example 111, wherein the amount of access requests to the limited access spectrum is determined by the controller.

Example 116 may include the controller of Example 111, wherein the amount of observed collisions and the amount of transmission errors is determined by the mobile communications device.

Example 117 may include the controller of any one of Examples 82-116, wherein the communications timing parameter is a contention window defining the time period.

Example 118 may include the controller of Example 117, wherein the contention window has a minimum time value and a maximum time value defining the time period.

Example 119 may include the controller of Example 118, wherein the contention window for the load level above the upper predefined threshold has a first time period, a first minimum time value, and a first maximum time value.

Example 120 may include the controller of any one of Examples 118 or 119, wherein the contention window for the load level below the lower predefined threshold has a second time period, a second minimum time value, and a second maximum time value, wherein the first time period is greater than the second time period, the first minimum time value is greater than the second minimum time value, and the first maximum time value is greater than the second maximum time value.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims, and all changes within the meaning and range of equivalency of the claims are therefore intended to be embraced.

What is claimed is:

1. A method of controlling access to a limited access spectrum via a controller, the method comprising:

authorizing a mobile communications device in a predefined geographic area to communicate via the limited access spectrum, wherein access by the mobile communications device to the limited access spectrum is based on a user profile defining access rights to the limited access spectrum;

determining a load level of communications on the limited access spectrum in the predefined geographic area; and allocating a communications timing parameter to the mobile communications device based on the load level, wherein the communications timing parameter defines a time period used by the mobile communications device to attempt a transmission, wherein the time period has a first value when the load level is above an upper predefined threshold, wherein the time period has a second value when the load level is below a lower predefined threshold, wherein the first value is greater than the second value, wherein the upper predefined threshold is different from the lower predefined threshold, wherein the time period has a third value when the load level is between the upper predefined threshold and the lower predefined threshold, wherein third value is greater than the second value and less than the first value.

2. The method of claim 1, wherein the communications timing parameter is further based on a priority status of a recipient of the communication from the mobile communications device.

3. The method of claim 1, further comprising:

updating the load level of communications on the limited access spectrum in the predefined geographic area after a predefined amount of time.

4. The method of claim 3, further comprising:

adjusting the communications timing parameter for the mobile communications device when the load level is changed after updating.

5. The method of claim 1, where the load level of communications on the limited access spectrum in the predefined geographic area is based on at least one of: an amount of access requests to the limited access spectrum, an amount of observed collisions, and/or an amount of transmission errors.

6. The method of claim 1, wherein the controller is a Spectrum Access System (SAS) controller.

7. The method of claim 1, wherein the user profile is a subordinate user allowed access to the limited access spectrum when superior user profiles are not presently accessing the limited access spectrum.

8. A non-transitory computer readable medium having computer executable instructions that cause a processing circuit to perform a method, the method controlling access to a limited access spectrum via a controller, the method comprising:

authorizing a mobile communications device in a predefined geographic area to communicate via the limited access spectrum, wherein access by the mobile communications device to the limited access spectrum is based on a user profile defining access rights to the limited access spectrum;

determining a load level of communications on the limited access spectrum in the predefined geographic area; and allocating a communications timing parameter to the mobile communications device based on the load level, wherein the communications timing parameter defines a time period used by the mobile communications device to attempt a transmission, wherein the time period has a first value when the load level is above an upper predefined threshold, wherein the time period has a second value when the load level is below a lower predefined threshold, wherein the first value is greater than the second value, wherein the upper predefined threshold is different from the lower predefined threshold, wherein the time period has a third value when the load level is between the upper predefined threshold and the lower predefined threshold, wherein third value is greater than the second value and less than the first value.

9. The non-transitory computer readable medium of claim 8, wherein the communications timing parameter is further based on a priority status of a recipient of the communication from the mobile communications device.

10. The non-transitory computer readable medium of claim 8, further comprising:

updating the load level of communications on the limited access spectrum in the predefined geographic area after a predefined amount of time.

11. The non-transitory computer readable medium of claim 10, further comprising:

adjusting the communications timing parameter for the mobile communications device if the load level is changed after updating.

12. A controller comprising one or more processors configured to control access to a limited access spectrum, wherein the controller is configured to:

authorize a mobile communications device in a predefined geographic area to communicate via the limited access spectrum, wherein access by the mobile communications device to the limited access spectrum is based on a user profile defining access rights to the limited access spectrum;

determine a load level of communications on the limited access spectrum in the predefined geographic area; and allocate a communications timing parameter to the mobile communications device based on the load level, wherein the communications timing parameter defines a time period used by the mobile communications device to attempt a transmission, wherein the time period has a first value when the load level is above an upper predefined threshold, wherein the time period has a second value when the load level is below a lower predefined threshold, wherein the first value is greater than the second value, wherein the upper predefined threshold is different from the lower predefined threshold, wherein the time period has a third value when the load level is between the upper predefined threshold and the lower predefined threshold, wherein third value is greater than the second value and less than the first value.

13. The controller of claim 12, wherein the communications timing parameter is further based on a priority status of a recipient of the communication from the mobile communications device.

14. The controller of claim 12, wherein the controller is further configured to update the load level of communications on the limited access spectrum in the predefined geographic area after a predefined amount of time.

15. The controller of claim 14, wherein the controller is further configured to adjust the communications timing parameter for the mobile communications device when the load level is changed after the updating.

16. The controller of claim 12, where the load level of communications on the limited access spectrum in the predefined geographic area is based on at least one of:

an amount of access requests to the limited access spectrum, an amount of observed collisions, and/or an amount of transmission errors.

17. The controller of claim 12, wherein the controller is a Spectrum Access System (SAS) controller.

18. The controller of claim 12, wherein the user profile is a subordinate user allowed access to the limited access spectrum when superior user profiles are not presently accessing the limited access spectrum.

* * * * *